(No Model.)

H. GASMIRE.
GLASS FURNACE.

No. 294,122. Patented Feb. 26, 1884.

Witnesses
Jno. K. Smith
L. C. Titler.

Inventor
Henry Gasmire
by his attorneys
Bakewell & Kerr

UNITED STATES PATENT OFFICE.

HENRY GASMIRE, OF WELLSBURG, WEST VIRGINIA.

GLASS-FURNACE.

SPECIFICATION forming part of Letters Patent No. 294,122, dated February 26, 1884.

Application filed September 24, 1883. (No model.)

*To all whom it may concern:*

Be it known that I, HENRY GASMIRE, of Wellsburg, in the county of Brooke and State of West Virginia, have invented a new and useful Improvement in Glass-Furnaces; and I do hereby declare the following to be a full, clear, and exact description thereof.

My invention relates to an improvement in glass-furnaces; and it consists in a furnace having an open melting-pot built around the eye of the furnace, the wall of the eye and the outer walls of the furnace constituting the walls—or serving to support the walls—of the annular basin which constitutes the melting-chamber, whereby the cost and expense of separate melting-pots, which are liable to crack and break, is obviated, and the loss of material is prevented.

I will now describe my invention, so that others skilled in the art may manufacture and use the same, reference being had to the accompanying drawings, forming part of this specification, in which—

Figure 1:
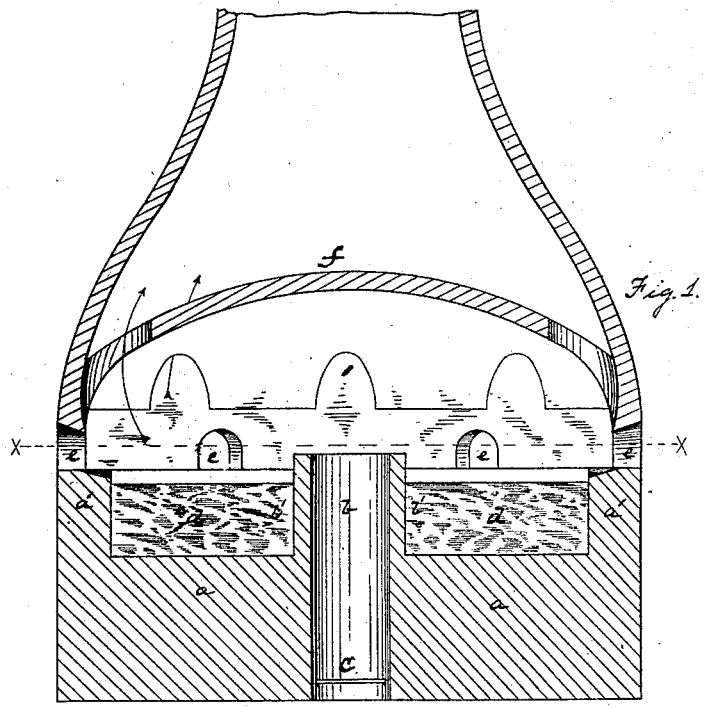
Figure 2:
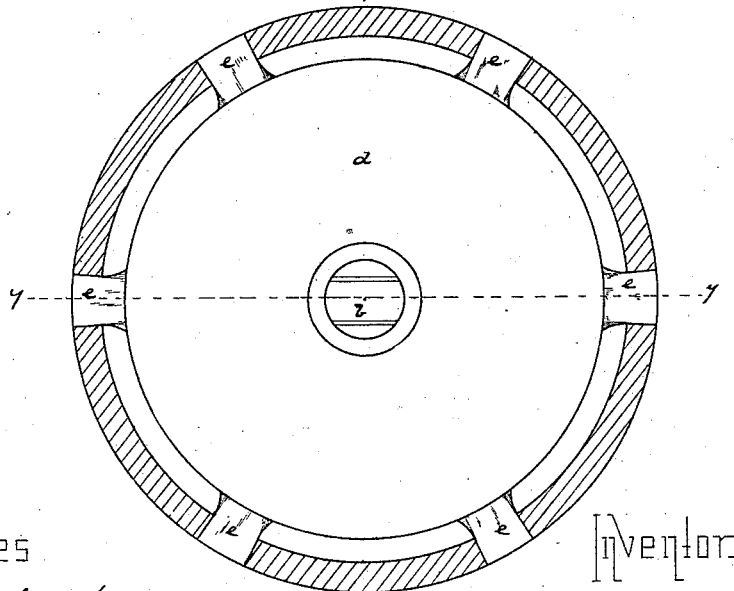

Figure 1 is a vertical sectional view of my improved furnace through the line $y\ y$, Fig. 2; and Fig. 2 is a horizontal sectional view of the same through the line $x\ x$, Fig. 1.

Like letters of reference indicate like parts wherever they occur.

In the drawings, $a$ represents the walls or bench of the furnace, through the middle or center of which the eye $b$ extends to the top thereof from the fire-chamber $c$.

Around the eye $b$ in the walls of the furnace is formed the open tank or receptacle $d$, the walls or sides of which are formed by the outer surface of the wall $b'$ of the eye $b$ and the inner surface of the wall $a'$ of the furnace. These walls are built of fire-brick or other suitable material. The tank $d$, inclosed by these walls, is circular in form, and is provided with a lining of fire-clay or other suitable material. Over the annular melting-chamber thus formed extends the usual arch or dome, $f$, which serves to deflect the flame, and in which are located the usual side flues leading to the stack above. Around the base of the arch and stack are formed mouths or openings $e$, through which the frit is introduced into the tank $d$ and the glass produced by the melting thereof is taken.

The operation is as follows: The tank $d$ having been supplied with the desired amount of frit through the mouths $e$, the glass is produced by the melting of the frit by the flames and heat, which ascend through the eye of the furnace, are deflected by the arch $f$, and spread over the mouth of the tank $d$ in the same manner as glass is produced in the open melting-pots now in general use. When the glass is ready to be removed from the furnace and formed into manufactured articles, the same method is employed as in the case of the separate open melting-pots.

The advantages of my invention are the cheapness of construction, as separate melting-pots are dispensed with; the greater production, as space is economized, and a greater surface of frit is exposed to the action of the heat, and the durability of the open tank or melting-pot, which prevents the loss of pots and material heretofore incurred from cracks and breakage caused by the heat.

I am aware that an annular melting pot or tank has been so combined with a furnace as to receive the flame around the sides and discharge it by a central flue connecting with the stack, and do not herein claim the same, as the outer walls of the pot have no support from the outer walls of the furnace, and are very liable to fracture, and because in such a construction special means must be provided for working the glass.

Having thus described my invention, what I claim, and desire to secure by Letters Patent, is—

1. In a glass-furnace, an open melting-pot built around the eye of the furnace, the walls of the furnace forming the sides and bottom of the melting-pot, substantially as and for the purposes specified.

2. In a glass-furnace, an open melting-pot built around the eye of the furnace, the walls of the furnace forming the sides and bottom of the melting-pot, the melting-pot having a lining of clay or other suitable material, substantially as and for the purposes specified.

In testimony whereof I have hereunto set my hand this 12th day of September, A. D. 1883.

HENRY GASMIRE.

Witnesses:
CHARLES N. BRADY,
ARTHUR P. AYLING.